Patented Feb. 27, 1923.

1,447,054

UNITED STATES PATENT OFFICE.

FRED R. WARNER, OF MINNEAPOLIS, MINNESOTA, ASSIGNOR TO THEO. HAMM BREWING COMPANY, A CORPORATION OF MINNESOTA.

PROCESS FOR MAKING BREAD.

No Drawing.     Application filed December 27, 1921. Serial No. 525,144.

*To all whom it may concern:*

Be it known that I, FRED R. WARNER, a citizen of the United States, residing at Minneapolis, in the county of Hennepin and State of Minnesota, have invented new and useful Improvements in Processes for Making Bread, of which the following is a specification.

It is the object of my invention to improve the chemical environment of yeast and gluten in dough used in making leavened bread.

Further objects of my invention are to reduce the period of fermentation, to conserve yeast and sugar and to improve the quality of the bread.

To secure these objects it is necessary to stimulate yeast activity and at the same time improve the chemical environment of the gluten in the flour and I believe that I have secured these advantages by the means herein specified.

From the baking stand-point flours may be more or less deficient in three particulars, (1) the quantity or percentage of gluten which they contain, (2) the quality or physical properties of the gluten and (3) yeast nutrients. The first of these, viz, the percentage of gluten, cannot be conveniently modified in the process of baking. The second or gluten quality can apparently be altered within certain limits, as it is known that certain ions have the property of rendering the gluten more elastic and coherent. With respect to the third item or yeast nutrients we are especially concerned since means are available for materially improving the chemical environment of yeast in the dough. Under this head there are several factors to be considered, including (A) The fermentable sugars originally present in the dough either in the flour used or added in-dry or syrup form as one of the dough components.

(B) Sugars formed from dextrins and starch through the activity of diastase during fermentation. Such sugars are useful since they are produced about as fast as they are used and thus tend to insure a fairly constant level of sugar concentration in the dough during fermentation.

(C) Organic and inorganic ions which increase the growth and activity of yeast in various ways. Prominent under this head are ammonium, phosphate, calcium and hydrogen ions and because of the influence of certain ions upon the gluten, attention must be given to the joint effect of any mixture upon the glutten and yeast simultaneously.

In order to secure fermentable sugar and active diastase I employ malt extract syrup and add to this certain ions which accelerate yeast activity and improve the quality or physical properties of the gluten. These ingredients may be used in about the proportion of 84% malt syrup and 16% of phosphate compounds including about $6\frac{1}{2}$% of diabasic ammonium phosphate, $6\frac{1}{2}$% of monobasic calcium acid phosphate and about 3% phosphoric acid. While such a composition and the dough made with it are distinctly acid yet the baked loaf made from dough containing it has no higher hydrogen ion concentration than is frequently encountered in bread made from untreated dough. The hydrogen ion concentration is, however, at a sufficiently high level to tend to diminish the development of the bread disease known as rope. The concentration of hydrogen ions is such as to increase the solubility, and hence the availability of the phosphate compounds, stimulate the yeast cells with respect to their propagation, and the activity of their more important enzymes, viz., zymase, sucrase or invertase, and maltase, render the gluten more coherent and elastic, since its environment is brought more nearly to its isoelectric point, and in combination with the malt syrup the dough is thus improved, the quantity of yeast required is reduced and the period of fermentation is shortened.

The above described ingredients, including the malt syrup and phosphate compounds, I prefer to thoroughly mix and then incorporate them with the yeast, flour and other ingredients of the dough after which the same may be worked, fermented and baked in the usual manner. My mixture of malt syrup and phosphates is so compounded as to carry the desirable additions of inorganic ions when the syrup is added in the proportion in which malt extract is usually employed in commercial baking.

Assuming, as an example, that a baker in a batch of quick straight dough has heretofore used 200 pounds of flour, 5 pounds of yeast, 5 pounds of sugar and 2 pounds of malt extract I have found that by substituting for the malt extract 2 pounds of my mixture the periods of fermentation may be reduced by about forty minutes with a substantial improvement in the quality of the bread or if the time element is not considered important the baker can withhold from his batch one and one-half pounds of the yeast, one pound of the sugar and the two pounds of malt extract, when the period of fermentation will remain about the same as in his old process with an improvement in the quality of the bread and an economy in the yeast and sugar to the extent indicated.

It is obvious, however, that most of the advantages of my process can be secured by adding the malt syrup, ammonium phosphate, calcium acid phosphate and phosphoric acid separately to the yeast, flour and other ingredients of the dough, and I consider such procedure within the spirit of my invention.

I have found also that a very substantial saving in the amount of yeast and sugar required or a substantial shortening of the period of fermentation will result from the use of the phosphate compounds and malt syrup in proportions varying substantially from those above specified, and such variation is included in the invention which I claim.

Having described my invention what I claim as new and desire to protect by Letters Patent is:

1. The process of making bread which comprises, assimilating with the dough a subnormal proportion of yeast and a quantity of malt syrup together with diabasic amonium phosphate, monobasic calcium acid phosphate and phosphoric acid, and then fermenting the dough.

2. The process of making bread which comprises incorporating with the flour, yeast and other usual ingredients of dough a combination of ammonium, calcium, phosphate and hydrogen ions, together with malt syrup and then fermenting the dough.

3. The process of making leavened bread which comprises incorporating with flour, yeast and other normal ingredients of dough a composition comprising malt syrup, diabasic ammonium phosphate, monobasic calcium acid phosphate and phosphoric acid.

4. The process of making bread which comprises, adding to the dough a combination of ammonium, calcium, phosphate and hydrogen ions, together with active diastase and sugars normally present in malt extract.

5. The process of making leavened bread which comprises incorporating with the flour, yeast and other normal ingredients of dough a composition comprising malt syrup, diabasic ammonium phosphate, monobasic calcium acid phosphate and phosphoric acid in about the proportion of eighty-four parts of malt syrup to six and one-half parts diabasic ammonium phosphate, six and one-half parts of monobasic calcium phosphate and three parts of phosphoric acid.

In testimony whereof, I have hereunto signed my name to this specification.

FRED R. WARNER.